United States Patent [19]

Hasegawa

[11] 4,368,543
[45] Jan. 11, 1983

[54] MULTIMODE FIBER LIGHTWAVE COMMUNICATION SYSTEM UTILIZING PULSE SELF-CONFINEMENT

[75] Inventor: Akira Hasegawa, New Providence, N.J.

[73] Assignee: Bell Telephone Laboratories, Incorporated, Murray Hill, N.J.

[21] Appl. No.: 230,322

[22] Filed: Feb. 2, 1981

[51] Int. Cl.$^3$ ............................................. H04B 9/00
[52] U.S. Cl. .................................. 455/612; 350/96.14; 350/96.15; 455/610
[58] Field of Search ............................. 455/610, 612; 350/96.14, 96.15

[56] References Cited

PUBLICATIONS

Optics Letters, vol. 5, No. 10, Oct. 1980, pp. 416–417.
Applied Optics, vol. 15, No. 2, Feb. 1976, pp. 483–491.
Optical Fiber Communications, pp. 28–31 and pp. 101–124, S. E. Miller and A. G. Chynoweth, Editors, Academic Press, New York, 1979.
Quantum Electronics: A Treatise, vol. I, Nonlinear Optics, Part A, H. Rabin and C. L. Tang, Editors, Academic Press, New York, 1975.
Physical Review Letters, vol. 45, No. 13, Sep. 29, 1980, pp. 1095–1098.
Appl. Phys. Lett., vol. 23(3), pp. 142–144, (1973).

*Primary Examiner*—Howard Britton
*Attorney, Agent, or Firm*—Richard D. Laumann; Eugen E. Pacher; Peter V. D. Wilde

[57] ABSTRACT

A multimode fiber lightwave communication system using pulses of center wavelength in the region of anomalous dispersion of the fiber material. For instance, in silica-based fiber, this implies a wavelength greater than about 1.3 $\mu$m. In such a system, modal dispersion can be reduced by using the nonlinear properties of the fiber material. In particular, by adjusting the pulse amplitude to satisfy the expression $$\left(\frac{v_{gj} - v_o}{v_{gj}}\right)^2 \leq 2\left(\frac{\partial v_{gj}}{\partial f_o} \frac{f_o}{v_{gj}}\right) \frac{\alpha n_2}{n_o} |\Phi|^2,$$

where
$v_{gj}$ is the group velocity of the j-th mode,
$v_o$ is the group velocity of the pulse,
$f_o$ is the center frequency of the pulse,
$n_o$ is the field-independent effective refractive index of the fiber at $f_o$,
$n_2$ is the quadratic coefficient of the refractive index of the fiber at $f_o$,
$|\Phi|$ is the absolute magnitude of the peak electric field in the pulse averaged over the cross-section of the guiding region, and $\alpha$ is a constant approximately equal to $\frac{1}{2}$, all modes whose group velocity satisfy the expression are "trapped", i.e., are prevented from spreading. The reduced mode dispersion permits e.g., operation of lightwave communication systems at increased data rates.

3 Claims, 1 Drawing Figure

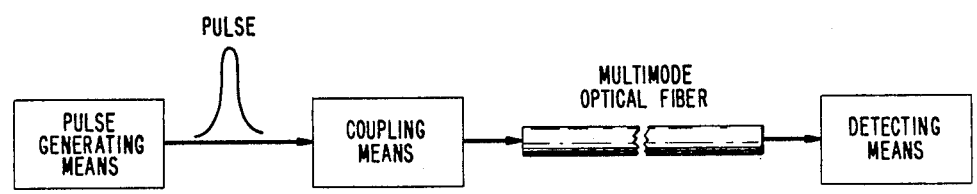

MULTIMODE FIBER LIGHTWAVE COMMUNICATION SYSTEM UTILIZING PULSE SELF-CONFINEMENT

FIELD OF THE INVENTION

This invention pertains to multimode fiber lightwave communication systems, more particularly, it pertains to a method for reducing mode dispersion in such systems, and to lightwave communication systems employing the method.

BACKGROUND

The refractive indices of transparent media, such as, for instance, glasses, are at low light intensities generally independent of intensity, but become dependent thereon at higher intensities. More generally, the refractive index of a material typically is a function of electric field. For purposes of this application, the relevant electric field is the electric field of the electromagnetic signal transmitted through a transparent medium, and the term "electric field" is used herein in this sense. This field-dependence of the refractive index (or, more generally, of a generalized susceptibility) results in a plethora of physical phenomena, the study of which constitutes the field of nonlinear optics. See, for instance, *Quantum Electronics: A Treatise*, Vol. 1, H. Rabin and C. L. Tang, Editors, Academic Press, New York (1975).

Lightwave communication systems almost universally employ lightguides as transmission media. These guides, also referred to as "optical fiber", typically comprise a core region having a maximum (field-independent) refractive index $n_o$, and a cladding having refractive index $n_1$, with $n_1 < n_o$, at least for a wavelength regime containing the operating wavelength of the system, in order to achieve guiding by means of total internal reflection. Lightguides of course can be designed for operation with other than visible electromagnetic radiation, and I will use the terms "optical" and "light" in this broader sense. In particular, I intend the terms to include the near infrared region of the spectrum.

The possible rate of information transmission through an optical fiber is generally expressed in terms of bandwidth, or of a maximum bit rate per second. This rate is limited, inter alia, by dispersion in the fiber, since, as light pulses travel through a fiber, typically each of the pulses broadens and eventually overlaps with its neighbors, resulting in an increase in the number of errors in the transmitted information. Three mechanisms are typically responsible for this pulse broading in fibers: material dispersion, waveguide dispersion, and modal dispersion. Of these, waveguide dispersion typically can be neglected because, inter alia, modes subject to substantial waveguide dispersion generally are selectively attenuated in multimode fiberguides. Material dispersion will typically also be small for conditions of interest in this application. For these reasons, and since this application is concerned with a method for reducing mode dispersion, the discussion of dispersion will be from here on substantially limited to mode dispersion.

As is well known, Maxwell's equations, when solved for the case of a fiber lightguide, have guided wave solutions only for a discrete set of waves. These allowed solutions, referred to as guided modes, can be labeled by two mode numbers, of which one describes, in the geometrical optics picture, the angle the ray of the wave makes with the axis of the fiber. Employing this geometrical optics picture, it is easy to see that modes differing in mode number will generally have different path lengths in the fiber, leading to pulse spreading due to mode dispersion. This spreading can be reduced by properly shaping the refractive index profile of the core region of lightguides. See for instance, *Optical Fiber Communications*, S. E. Miller and A. G. Chynoweth, Editors, Academic Press, New York (1979), especially Chapter 3, pages 37–100. However, no profile is known that will result even in theory in zero mode dispersion in fibers carrying more than two modes. Furthermore, practical limitations in fiber manufacture make exact reproduction of a theoretical profile difficult to achieve, resulting typically in fibers having actual bandwidth less than the theoretically achievable maximum. Since on the other hand wavelength regimes exist in which material dispersion is small and in which modal dispersion is the dominant dispersion mechanism, a method for reducing modal dispersion beyond what is achievable by means of fiber design is clearly of considerable practical interest. Such a method can lead to improved multimode optical fiber data transmission systems.

BRIEF DESCRIPTION OF THE DRAWING

The drawing schematically shows a fiber lightwave communication system according to the invention.

SUMMARY OF THE INVENTION

Modal dispersion in multimode optical fibers can be reduced by appropriately using the nonlinear properties of the transmission medium. In particular, the electric field of a pulse traveling through a fiber lightguide induces a change in the refractive index of the fiber, and this effect can be used to accomplish a "trapping" of a number of modes of the pulse. This means that the "trapped" modes are essentially prevented from spreading. The degree of trapping depends on fiber properties and the electric field intensity in the pulse. By properly selecting the center wavelength and the amplitude of the pulse coupled into the fiber, one can thus achieve transmission of pulses substantially free of mode dispersion at least for a number of modes, typically lower-order modes, resulting typically in a lightwave communication system having greater rate-length product than an analogous prior art system.

Practice of the invention requires choice of carrier wavelength $\lambda_o$ (i.e., center wavelength of the pulse) in the so-called "anomalous dispersion" regime of the fiber material. For high-silica fiber, this requires $\lambda_o \gtrsim 1.3\ \mu m$, with the exact numerical value of the limit depending on the composition of the core material. The amplitude of the pulse of electromagnetic radiation coupled into the input end of the fiber is to be adjusted to satisfy the expression $$\left(\frac{v_{gj} - v_o}{v_{gj}}\right)^2 \leq 2\left(\frac{\partial v_{gj}}{\partial f_o}\ \frac{f_o}{v_{gj}}\right) \frac{\alpha n_2}{n_o} |\phi|^2$$

for all modes j that are to be "trapped". All symbols used in this expression are defined below.

DETAILED DESCRIPTION

A derivation of the results given below is contained in A. Hasegawa, *Optics Letters*, Vol. 5(10), October 1980, pp. 416–417, incorporated herein by reference. In the following only a brief development of the derivation will be given.

The amplitude modulated electric field of the j-th mode in a multimode fiber can be represented by the expression $$\text{Re } \Phi_j(x,t) \exp i(k_j x - \omega_j t),$$

where $\Phi_j(x,t)$ is the complex field amplitude, averaged over the fiber cross-section. This quantity obeys, in the case of negligible fiber loss, the nonlinear Schroedinger equation $$i\left[\frac{\partial \Phi_j}{\partial t} + v_{gj} \cdot \frac{\partial \Phi_j}{\partial x}\right] + \frac{1}{2}\left[\frac{\partial v_{gj}}{\partial k_j} \frac{\partial^2 \Phi_j}{\partial x^2}\right] + \frac{\alpha n_2 \omega_j}{n_o} |\Phi|^2 \Phi_j = 0. \quad (1)$$

The subscript j stands for the usual two mode indices, t is the time, x the axial fiber coordinate, $k_j$ and $\omega_j$ the wavenumber and angular frequency of the j-th mode, respectively, "Re" signifies the real part, $v_{gj} = (\partial \omega_j/\partial k_j)$ is the group velocity of the j-th mode, $n_o$ is the usual low-field refractive index (at radial frequency $\omega_j$), $n_2$ is the coefficient of the term quadratic in the electric field in the refractive index (the so-called Kerr coefficient), $\alpha \approx \frac{1}{2}$ is a factor due to the inhomogeneity of the electric field over the cross-section of the fiber, and $$|\Phi|^2 = \sum_j |\Phi_j|^2.$$

Equation (1) indicates that the wave packet of the j-th mode experiences an "attractive" interaction if $(\partial v_{gj}/\partial k_j) > 0$, i.e., if the mode frequency is in the so-called "anomalous" dispersion regime of the fiber medium. The existence of this "attraction" can be more clearly demonstrated by constructing the Hamiltonian of Equation (1) and solving the canonical equations of motion for the quasi-particle that represents the j-th mode in this picture. The equations of motion then represent the motion of a (fictitious) particle of mass $$m_j = \left(\frac{\partial v_{gj}}{\partial k_j}\right)^{-1}$$

and initial velocity $v_{gj}$ in a potential field $V = (\alpha n_2 \omega_j/n_o)|\Phi|^2$. They show that, if $(\partial v_{gj}/\partial k_j) > 0$, the potential is attractive, and that therefore the mode is attracted toward the center of the multimode pulse. Thus, provided that $v_{gj}$ is smaller than the "escape velocity" of the potential, the mode is trapped. Since the "potential", a manifestation of the electric field of the pulse, is moving at $v_o$, the average group velocity of the pulse, the condition for trapping of the j-th mode is $$(v_{gj} - v_o)^2 \leq 2\left[\frac{\partial v_{gj}}{\partial k_j} \frac{\alpha n_2 \omega_j}{n_o}\right] |\Phi|^2, \quad (2)$$

which can be transformed into $$\left(\frac{v_{gj} - v_o}{v_{gj}}\right)^2 \leq 2\left[\frac{\partial v_{gj}}{\partial f_j} \frac{f_j}{v_{gj}}\right] \frac{\alpha n_2}{n_o} |\Phi|^2, \quad (2')$$

where $f_j$ is the frequency of the j-th mode, which, for practical purposes, is of course identical with the center frequency of the pulse, $f_o$.

Equation (2') can conveniently be used to determine which modes will be trapped by a pulse of a given amplitude and center frequency, in a given fiber. Equivalently, if it is known that at low amplitude a fiber has a certain effective group delay then the equation allows determination of the pulse amplitude required to prevent mode dispersion.

The derivation of equation (2') neglects fiber loss. Since loss is present in any real fiber, the derived result is only approximate for long fiberguide links, since modes that are just trapped near the input end of the guide become free (i.e., dispersive) as pulse power becomes attenuated. Thus, in practicing my invention it is typically advantageous to increase the pulse power beyond the minimum value required by equation (2') by a factor that depends, inter alia, on the fiber loss and the length of the line. The determination of this factor requires, e.g., group delay measurements on the line, or other equivalent measurements. Such measurements are standard and well known in the art. They typically show that, in order to prevent substantial spreading of all modes having, at low amplitude, mode delay less than $\Delta t$ sec/km in a fiber channel of length L and attenuation of $\gamma$ db/km, the input amplitude of the pulse should be chosen approximately a factor of $(\gamma L/2)$ db larger than that given by the equality in Equation (2'). However, this relationship should be considered as a rule of thumb and first approximation only.

In fiber lightwave communication systems, such as, for instance, in a system as shown schematically in the FIGURE, in which the pulse generating means produce a pulse of electromagnetic radiation that is coupled into a multimode optical fiber by the coupling means and detected, after propagation through the fiber, by the detecting means, typically a design choice is made as to the data transmission rate (also referred to as bit rate or, loosely, as bandwidth) at which the system is to operate. In so-called bandwidth-limited systems it is this choice that dictates the permissible link length for a given fiber lightguide, and my invention can, for instance, be advantageously practiced in such systems, since in them reduced mode dispersion makes possible transmission at the design bit rate over a link of increased length without increase in the error rate in the transmission. Of course, if the data transmission rate of the system is not fixed as a design parameter then practice of the invention allows an increase in the maximum bit rate of a link of unchanged length or increases in both link length and bit rate, as will be evident to those skilled in the art.

Thus, in general, a lightwave communication system according to the invention has a larger value of the rate-length product, i.e., maximum data transmission rate times link length (or repeater spacing), than a corresponding prior art system, if all linear effects of changes in input signal amplitude are taken into account.

Operationally, this comparison can be achieved by measuring the parameters of a lightwave communication system for relatively low input amplitudes, and determining how these parameters scale with increasing amplitude and link length, keeping all else constant. These measurements are to be carried out at prior art signal amplitudes at which nonlinear effects are negligible, typically using input power less than about 1 mw. The parameter of primary interest here is bandwidth, and the measurements result in determining the (linear) rate-length product as a function of input power. Being linear, this function can be extrapolated to the link length $L_e$ and data rate $B_e$ at which a (linear) system could be operated with input signal amplitude A. The quantity $B_e L_e$ can be compared with $B_n L_n$, the corresponding quantity determined from the actual (i.e., nonlinear) system when operated with the same signal amplitude. A system according to the invention would show a measurable difference, of the order of at least about 5%, i.e., $1.05\, B_e L_e \leq B_n L_n$.

Other equivalent schemes could be devised for evaluating the difference between prior art systems and systems practicing my invention, and, of course, a theoretical determination of the linear rate-length product is also possible.

Furthermore, since an advantageous way of practicing the invention is in bandwidth-limited systems, a system according to the invention typically has at the receiver a signal amplitude in excess of the amplitude required to yield the minimum acceptable signal to noise ratio for the receiver used, of the order of at least about five times the minimum amplitude.

EXAMPLE

A lightwave communication system comprising a multimode silica/germania fiber lightguide is operated at a center wavelength near 1.5 μm where $n_o \approx 1.5$, $n_2 \approx 3 \cdot 10^{-22}$ (m/V), and $$\frac{\partial v_g}{\partial f_o} \frac{f_o}{v_g} \approx 5 \cdot 10^{-2},$$

with $\alpha = 0.5$. Then Equation (2') predicts that, in the absence of loss in the fiber, a pulse having field strength of $10^6$ V/m traps modes having a mode delay of up to approximately 10 ps/km. Assume that the fiber has a (linear) bandwidth $B_e = 5$ gigabits·sec$^{-1}$·km$^{-1}$, and that it has been determined experimentally or theoretically that, provided that modes having (in the linear system) a mode delay of less than 10 ps/km can be transmitted without mode dispersion, the bandwidth of the fiber is 6 gigabits·sec$^{-1}$·km$^{-1}$, i.e., pulses can be transmitted at a 20% higher rate than in the linear system, with no increase in the error rate. Thus, if the linear system has a rate-length product $B_e L_e = 5 \cdot 10^9$ bits·sec$^{-1}$ then the system operated according to the invention has $B_n L_n = 6 \cdot 10^9$ bits·sec$^{-1}$.

If the fiber has a loss of 2 db/km then, as a first approximation, the input power to the fiber should be increased by $\approx L_n$ db over the value determined from Equation (2'). For instance, if the fiber has a core diameter of 25 μm, then the required field of $10^6$ V/m implies a linear energy density of approximately $3 \cdot 10^{-9}$ joules/m in the wave packet constituting the pulse in the fiber core. This corresponds to a pulse input power of approximately 0.6 watts. If $L_n = 20$ km, then this power can be increased by approximately 10 db as a first approximation to counteract the effect of attenuation.

What is claimed is:

1. A multimode fiber lightwave communication system using pulses of electromagnetic radiation of center frequency $f_o$ and group velocity $v_o$, the system comprising
   (a) means for generating the pulse with $f_o$ such that $(\partial v_{gj}/\partial k_j) > 0$ in the guiding region of the fiber, and
   (b) means for coupling at least a part of the energy in the pulse into the guiding region of the fiber,
CHARACTERIZED IN THAT
   (c) the electric field of the pulse in the guiding region satisfies $$\left(\frac{v_{gj} - v_o}{v_{gj}}\right)^2 \leq 2\left(\frac{\partial v_{gj}}{\partial f_o} \frac{f_o}{v_{gj}}\right) \frac{\alpha n_2}{n_o} |\Phi|^2$$

for at least one mode of mode number j, wherein
   $v_{gj}$ is the group velocity of the j-th mode,
   $k_j$ is the wavenumber of the j-th mode,
   $n_o$ is the field-independent effective refractive index of the fiber at $f_o$,
   $n_2$ is the quadratic coefficient of the refractive index of the fiber at $f_o$.
   $|\Phi|$ is the absolute magnitude of the peak electric field in the pulse averaged over the cross-section of the guiding region, and
   $\alpha$ is a constant approximately equal to $\frac{1}{2}$.

2. A multimode fiber lightwave communication system having link length $L_n$ and maximum data transmission rate $B_n$ when operated with input signals to the fiber of amplitude A and center frequency $f_o$, the system comprising
   (a) means for generating pulses of electromagnetic energy of center frequency $f_o$,
   (b) a multimode fiber link of length $L_n$ having a transmitter end and a receiver end,
   (c) means for coupling pulses of amplitude A into the guiding region of the fiber at the transmitter end, and,
   (d) means for detecting the signals at the receiver end
CHARACTERIZED IN THAT
the system has a rate-length product $L_n B_n \geq 1.05\, B_e L_e$, with $B_e L_e$ determined for the linear system operated with pulses of amplitude A and center frequency $f_o$, wherein $B_e$ is the linear maximum data transmission rate, and $L_e$ the linear link length.

3. A multimode fiber light wave communication system using pulses of electromagnetic radiation of center frequency $f_o$, the fiber having a transmitter end and a guiding region comprising material having anomalous dispersion for radiation of frequency $f_o$, the system comprising
   (a) means for generating the pulses with center frequency $f_o$,
   (b) means for coupling at least part of the energy in the pulse into the guiding region at the transmitter end of the fiber,
CHARACTERIZED IN THAT
   (c) the absolute magnitude of the peak electric field of the pulse in the guiding region at the transmitter end of the fiber, averaged over the cross-section of the guiding region, is at least about $10^6$ V/m.

* * * * *